United States Patent Office 3,391,277
Patented July 2, 1968

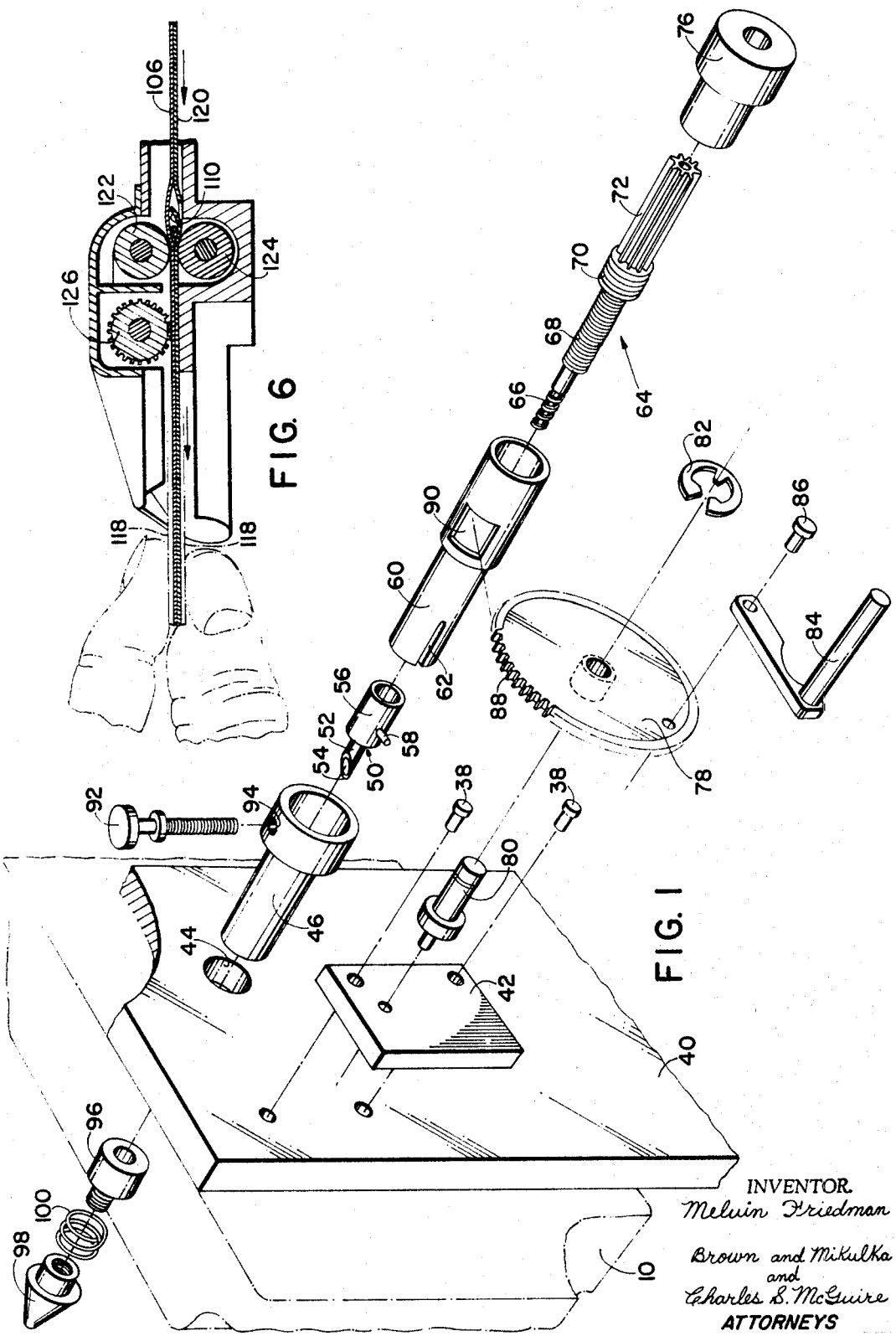

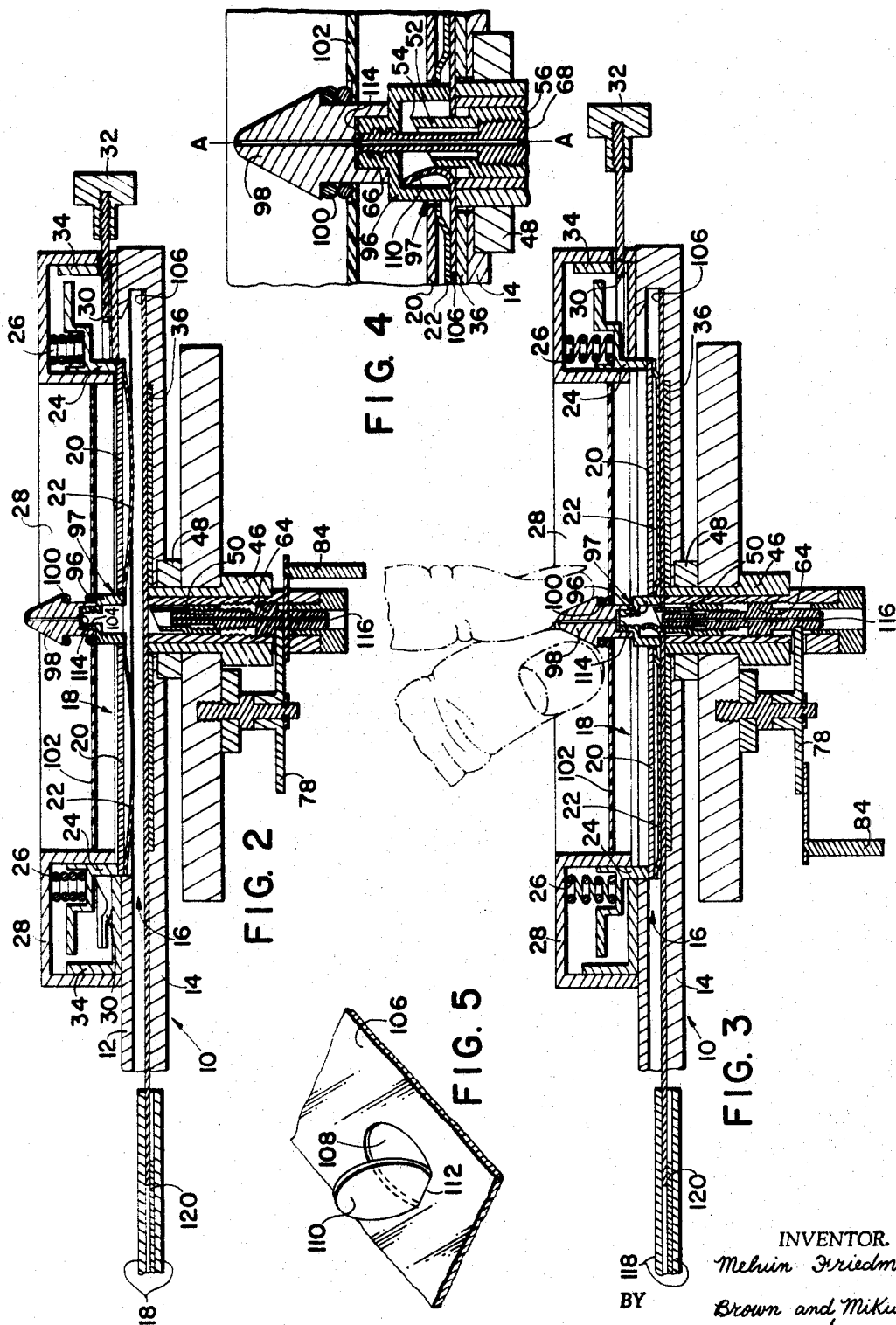

3,391,277
X-RAY FILM CASSETTE FOR BACK-REFLECTION LAUÉ PHOTOGRAPHY HAVING MEANS FOR CUTTING AN EXPOSURE OPENING IN THE FILM
Melvin Friedman, Arlington, Mass., assignor to Polaroid Corporation, Cambridge, Mass., a corporation of Delaware
Filed Feb. 14, 1966, Ser. No. 527,274
10 Claims. (Cl. 250—68)

The present invention relates to X-ray photography, and more specifically to film-holding cassettes especially useful in X-ray crystallography.

A common technique used in making X-ray exposures for various purposes is known as back-reflection Laue photography. One useful application of this technique, for example, is the determination of crystal structures and orientation. The X-ray beam is directed through an opening, usually at the center of the film and the cassette, to impinge upon the crystal, positioned on the opposite side of the film and cassette from the X-ray tube. At least a portion of the X-rays are reflected by the crystal back upon the film in a pattern indicative of the structure and orientation of the crystal. After exposure in this manner, the film is removed from the cassette and developed in the usual way. It is then necessary to reconstruct the portion of the film which was removed to form the opening so that precision measurements of the pattern may be taken from a reference position, normally the axis of the X-ray beam.

In most common techniques of making X-ray exposures of the back-reflection Laue type, the negative to be exposed is first held within a cutting jig while the hole necessary for passage of the X-ray beam is cut through the negative. It is then necessary to remove the negative from the jig and place it in a proper cassette for exposure, while protecting the photosensitive surface from actinic radiation. It is a principal object of the present invention to provide novel film holding means which permit X-ray exposures to be made with the X-ray beam directed through an opening in the negative, wherein the hole may be cut or punched while the negative is held in position for exposure.

A further object is to provide apparatus for holding a photosensitive sheet during exposure to X-rays wherein means aree provided for allowing the X-ray beam to pass through an opening in both the sheet and the holding apparatus, and wherein the portion of the sheet which is removed to allow passage of the beam is automatically replaced in its original position after exposure.

Another object is to provide novel apparatus for holding during X-ray exposure, and for providing an opening through, a photosensitive sheet of a conventional film packet of a type presently in commercial use.

A still further object is to provide a novel combination of elements which permit X-ray exposures of the back-reflection Laue type to be made, processed and analyzed with speed, accuracy and simplicity.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a fragmentary, exploded perspective view of certain elements of one embodiment of the apparatus of the invention;

FIG. 2 is a side elevational view in cross section through the center of the apparatus of FIGURE 1;

FIG. 3 is a side sectional view, as in FIG. 2, showing certain elements in another position;

FIG. 4 is an enlarged, fragmentary, sectional view of portions of the apparatus of FIGS. 2 and 3 shown in still another position;

FIG. 5 is an enlarged, perspective view of a fragment of the film sheet held within the apparatus; and FIG. 6 is a fragmentary side sectional view of a portion which may be incorporated with the apparatus.

In copending U.S. patent application Ser. No. 397,938, filed Sept. 21, 1964, which is now Patent No. 3,330,953, there is disclosed a cassette for holding a photosensitive film during X-ray exposures of the back-reflection Laue type. The apparatus of the invention disclosed in the said copending application includes previously known elements of photographic apparatus for use with film assemblages of a type presently in commercial use. The previously known apparatus and film assemblages referred to are presently manufactured by Polaroid Corporation, Cambridge, Mass. and designated as the Land 4 x 5 film holder No. 500, and Land film packets types 52, 53, 57, 510, etc. Both the film holder and packets are described in detail in U.S. Patent No. 2,933,993 of Albert J. Bachelder et al., issued Apr. 26, 1960. The embodiment of the invention disclosed in the aforementioned pending application provides a modification of and additional elements used with the previously known film holder and packets which permits use thereof in making back-reflection Laue exposures without an opening through the photosensitive sheet or the light barrier used to protect the sheet. While such exposures are satisfactory for many purposes, it is still sometimes desirable to allow the X-ray beam to strike the subject without attenuation by the photosensitive sheet or the light barrier, as is the case with the apparatus of application Ser. No. 397,938 filed Sept. 21, 1964, which is now Patent No. 3,330,953. The disclosed embodiment of the present invention is shown in combination with elements substantially identical to those used in the aforementioned copending application, and provides further means which allow such apparatus to be used in making exposures without attenuation of the X-ray beam in passing from the X-ray tube to the subject. That is, means are provided according to the present invention for allowing the X-ray beam to pass through an opening in the film and cassette, as is the usual back Laue exposure techniques, and wherein the opening is formed in the negative as it is held in position for exposure.

Elements of the present invention common to the apparatus of copending application Ser. No. 397,938 filed Sept. 21, 1964, which is now Patent No. 3,330,953, are shown in the side sectional views of FIGS. 2 and 3. Such elements include the basic film holding device designated generally by the reference numeral 10, and including front section 12 and rear section 14 which are arranged to form therebetween a light-tight chamber 16 into which may be inserted an appropriate sheet of cut film or film unit. An exposure opening is formed in front section 12, the photosensitive surface of a film unit positioned for exposure within chamber 16 being arranged in registration with the opening for exposure therethrough. Flexible light barrier 18 is arranged in covering relation to the opening in front section 12 so that visible light cannot strike the photosensitive surface of the film within holder 10. In a preferred embodiment, light barrier 18 is in the form of an inflated bag having opposing walls 20 and 22. The bag is sealed at its peripheral edges and secured to movable frame 24, having a wall member of substantially the same configuration as the exposure opening in front section 12 and movable through this opening toward and away from the film unit disposed within chamber 16. Walls 20 and 22 may be constructed from any of a wide number of suitable materials to provide an essentially air-tight bag which is opaque to visible light while permitting passage of X-rays with minimal attenuation. Springs 26 are arranged between movable frame 24 and stationary light shield 28, which extends around movable frame 24, whereby the springs exert a biasing force urging frame 24 toward movement of the wall portion thereof through the opening in front section 12 and into engagement with the film unit. U-shaped slide member 30 is arranged within light shield 28 and is reciprocally movable by means of manually engageable handle 32. Slide 30 includes appropriate cam surfaces for engaging portions of movable frame 24 as the slide member is moved to produce the aforementioned movement of frame 24 under the bias of springs 26. Frame 34 is affixed to front section 12 around the exposure opening therein, by means of rivets, for example, providing the surface upon which slide 30 moves and also cooperating with light shield 28 to prevent entry of light into chamber 16.

The elements described in the preceding paragraph are all shown and described in greater detail in copending application Ser. No. 397,938 filed Sept. 21, 1964, which is now Patent No. 3,330,953, both as to structure and function. With handle 32 moved to its closest position to holder 10, as in FIG. 2, slide 30 is positioned to maintain movable frame 24 away from rear section 14 against the bias of springs 26, thereby permitting a film unit to be freely inserted in chamber 16. When a film unit has been so inserted, movement of handle 32 away from holder 10 moves slide 30 to allow springs 26 to urge frame 24 toward engagement with the film unit. As frame 24 is so moved, light barrier 18 contacts the surface of the photosensitive sheet and the air pressure within the bag formed by walls 20 and 22, the latter being constrained by fixed engagement around their peripheries to frame 24, urges the photosensitive sheet into close engagement with intensifying screen 36, which is arranged within an appropriate recess in rear section 14. The elements described in the following paragraphs are associated with the previously described elements of the prior art to result in the structure providing the objects and advantages of the present invention.

Turning now to a more detailed consideration of FIGURE 1, a fragment of film holder 10, having the previously described elements associated therewith, is shown in phantom lines. Support plates 40 and 42 are fixedly attached to holder 10, by means of screws of rivets 38, for example, on the rear side thereof, i.e., the side which faces the X-ray tube. Plate 40 includes opening 44 through which is inserted one end of cylindrical element 46. As best seen in FIGS. 2 and 3, element 46 also extends through like openings in rear section 14 of holder 10 and bushing 48 which is positioned between the holder and the support plate. Hollow cutter element 50 includes leading portion 52, having cutting edge 54, and trailing portion 56, of larger diameter than portion 52 and having fixed pin 58 extending outwardly therefrom. Cutter element 50 is slidably inserted in hollow cylinder 60 with pin 58 extending through slot 62.

Screw 64 includes threaded portions 66, 68 and 70 and radially extending splines 72. The threads of portion 70 are engaged with internal threads within cylinder 60; the threads of portion 68 are engaged with internal threads in trailing portion 56 of cutter element 50; the outside diameter of the threads on portion 66 is smaller than the inside diameter of leading portion 52 of cutter element 50, whereby portion 66 may pass freely through the cutter element. The splined end of screw 64 is covered by end cap 76 which fits over and is secured to the end of cylinder 60.

Gear 78 is rotatably mounted on pin 80, which extends from plate 42, and is secured by snap ring 82. Manually engageable handle 84 is secured to gear 78 by rivet 86. Radially extending teeth 88 of gear 78 extend through opening 90 in hollow cylinder 60 to engage splines 72 on screw 64. Thus, rotation of gear 78 by means of handle 84 will rotate screw 64 and move the latter axially with respect to hollow cylinder 60, which is held stationary by engagement therewith of set screw 92, extending through opening 94 in cylindrical element 46. Cutter element 50 is also moved axially through engagement of threaded portion 68 of the rotating screw with the internal threads in the cutter element, the latter being restrained against rotation by engagement of pin 58 in slot 62. The pitch of the threads on portions 68 and 70, and that of the corresponding internal threads in elements 50 and 60, is so constructed that the screw moves axially at a faster rate than the cutter element. That is, the threads on portion 70 have a greater pitch than those on portion 68, screw 54 being advanced at a rate dependent on the former and cutter element 50 at a rate dependent on the latter, whereby the screw moves axially relative to the cutter element as well as to cylinder 60.

As shown in FIGS. 2–4, element 96 extends through a centrally disposed opening 97 in light barrier 18, the bag formed by walls 20 and 22 being sealed around the opening. Conical element 98 is adjustably secured to element 96; spring 100 is arranged between a shoulder on conical element 98 and rigid sheet 102 to exert a biasing force urging elements 96 and 98 away from the rear side of holder 10. Sheet 102 is provided for the purpose of acting as a stationary support for spring 100 and accordingly comprises a substantially rigid sheet of suitable material, such as an opaque plastic, supported by light shield 28 and having a light sealed opening for movement therethrough of element 96. The threads on portion 66 of screw 64 are adapted to engage internal threads 104 within element 96. Since screw 64 and element 96 are initially positioned on opposite sides of the negative sheet, it is necessary for end portion 66 to extend out of cutter element 50 and through the sheet in order to engage the threads within element 96. This is made possible by the fact that threads 68 and 70 are of different pitch and that the cutter element is so arranged with respect to screw 64 that an opening is cut in the negative before the end of the screw is advanced outside the cutter element.

The above-described arrangement of elements and sequence of operations in preparing a sheet of film for exposure are illustrated in the sectional views of FIGS. 2 through 4. The elements are shown in FIG. 2 in their initial positions after insertion of a negative sheet, indicated by the reference numeral 106, into the light-tight chamber through an appropriate insertion and withdrawal portion, an example of which is described hereinafter. The movable light barrier is positioned away from the intensifying screen to allow the negative to be freely inserted into the holder with the photosensitive surface of the negative facing the screen. Also, screw 64 and cutter element 50 are positioned entirely to one side of chamber 16 so that they will not interfere with insertion of the negative.

After insertion of the negative, handle 32 is moved by the operator from the position shown in FIG. 2 to that shown in FIG. 3. This serves to move slide element 30 toward the right as seen in these figures, thereby moving the portion of this element which initially supports frame 24 against the bias of springs 26. Frame 24 is moved to the lower position, shown in FIG. 3, under the bias of springs 26, upon movement of handle 32 to the FIG. 3 position. Light barrier 18 is moved along with frame 24 so that wall 22 of the air-filled bag presses against the surface of negative 106; the positive air pressure within the bag thus serves to urge the negative into close contact with the surface of intensifying screen 36.

With frame 24 and light barrier 18 in the position shown in FIG. 3, the operator pushes on conical element 98, thereby moving element 96 toward contact with the negative through opening 97 in light barrier 18. Spring 100 is thereby compressed between rigid, transparent sheet 102 and the shoulder on conical element 98. With elements 96 and 98 held firmly in the depressed position of FIG. 3, handle 84 is moved to rotate gear 78, thereby advancing screw 64 and cutter element 50 as previously explained. Edge 54 of cutter element 50 pierces the negative as the elements are advanced and cuts a partially circular opening therein. Edge 54 is so designed and moved that no portion of the negative is completely severed when the cut is made, but rather a movable flap is formed. This is illustrated more clearly in the enlarged fragment of FIG. 5 which shows a portion of negative 106 with opening 108 formed by cutting and moving flap 110 to the illustrated position. Flap 110 remains attached at portion 112 to the negative.

The elements are shown in FIG. 3 just after the negative has been cut by advancement of cutter element 50. It will be noted that end portion 66 of screw 64 has been advanced with respect to cutter element 50 from the retracted position of FIG. 2 to a position approximately even with edge 54 of cutter element 50. Further movement of handle 84 will cause continued advancement of both cutter element 50 and screw 64, the latter at a greater rate than the former, as previously explained. The elements are ultimately moved to the position shown in the enlarged view of FIG. 4, wherein cutter element 50 protrudes a greater distance through opening 108 in the negative and end portion 66 has been advanced to extend a considerable distance outside the cutter element. The external threads on end portion 66 of screw 64 are designed to engage internal threads 104 in element 96 during the terminal portion of the advancement of screw 64. Thus, elements 96 and 98 will be retained in the position shown in FIG. 4, against the bias of spring 100, by engagement of end portion 66 of screw 64 with element 96.

With the elements in the positions just described, the negative is ready for exposure. The X-ray tube is positioned to direct a beam along the axis indicated in FIG. 4 by the line A—A. The crystal, or other such target for the X-ray beam, is positioned along this axis forwardly of the apparatus. It will be noted that axially aligned openings are provided in each of the appropriate elements so that a path is provided along line A—A for the passage of the X-ray beam. Light seal means are provided to prevent the entry of visible light, which may cause undesirable fogging of the negative, through the openings provided for the passage of the X-ray beam at both the front and rear of the apparatus. Such means may conveniently comprise a thin layer of black polyethylene, opaque to visible light but substantially transparent to X-rays, positioned at any convenient location in covering relation to the openings. Such means are illustrated in FIGS. 2 through 4 and indicated by the reference numerals 114 and 116. Exposure is then effected by passing the X-ray beam along line A—A to strike the target, e.g., a crystal structure, the beam then being reflected back through light barrier 18 and negative 106 to impinge upon intensifying screen 36 in a pattern indicative of the structure and orientation of the crystal. The intensifying screen is stimulated by the X-rays in the usual manner to produce visible light which exposes the negative in the areas of contact thereof with light-emitting areas of the intensifying screen.

After exposure in the above-described manner, handle 84 is counterrotated back to the position of FIG. 2. As end portion 66 of screw 64 is retracted the external threads thereon are disengaged from element 96, thereby allowing spring 100 to move elements 96 and 98 back to the position of FIG. 2. Screw 64 and cutter element 50 continue to be retracted, moving from the position of FIG. 4, back through the position shown in FIG. 3, to their initial positions of FIG. 2. Handle 32 is moved from right to left so that it is also returned to its position of FIG. 2, thereby moving the raised portions of slide element 30 back into engagement with frame 24. This serves to move frame 24 against the bias of springs 26 and to lift light barrier 18 out of engagement with negative 106, which may then be removed from the light-tight chamber for processing.

Although the apparatus is suited to employ single sheets of a conventional negative which may be inserted into and withdrawn from the light-tight chamber in a darkroom, it is also well suited for incorporation with apparatus employing film units of the self-developing type, such as those mentioned earlier in the present description. These films units include a single sheet of negative, a cooperable image receiving sheet and a container carrying a viscous liquid processing agent for distribution between the sheets, to form a transfer image in a 4 x 5 inch format. The two sheets are initially contained within an opaque envelope which is inserted into the film holding apparatus. The envelope and receiving sheet may then be partially withdrawn from the apparatus leaving the image area of the negative positioned for exposure within the apparatus. After exposure of the negative the envelope and receiving sheet are again fully inserted into the apparatus and the entire film unit is then withdrawn between a pair of pressure-applying members which serve to rupture the container and distribute the contents thereof between the sheets. After the required period for development and formation of the transfer image, the sheets are withdrawn from the envelope and separated, with a developed negative image on the surface of one sheet and a positive image on the other.

In FIGS. 2 and 3 are shown fragments of an opaque envelope 118 and image receiving sheet 120 which have been partially withdrawn from light-tight chamber 16 of the holding apparatus of the invention. The envelope, negative and receiving sheet comprise a portion of a typical film assembly of the aforementioned type. Such film units and the apparatus wherein they are employed include elements not shown in the present drawings, such as a removable light cap for the open end of the envelope and means for retaining the negative sheet within the light-tight chamber when the envelope and receiving sheet are partially withdrawn. Such elements are not shown in detail since they form no part of the present invention and are well known in the art.

The fragmentary, sectional view shown in FIG. 5 illustrates the film unit insertion and withdrawal portion of processing apparatus for such self-developing film units. Such a portion may conveniently be provided at the left hand end of the apparatus of the present invention as pictured in FIGS. 2 and 3. The insertion and withdrawal portion includes a pair of juxtaposed pressure-applying members in the form of rolls 122 and 124. Suitable means (not shown) are provided for moving one of the rolls laterally with respect to the other to provide a space for the insertion of the film unit and the partial withdrawal and reinsertion of the envelope and receiving sheet. The rolls are returned to close proximity for final withdrawal of the film unit so that a compressive force will be applied, thereby rupturing the container and spreading the liquid content thereof between the sheets. Roll 126 is made of a resilient material such as sponge rubber and has flexible splines extending radially therefrom for the purpose of insuring a light-tight insertion and withdrawal portion. Since flap 110 remains attached to the negative sheet in portion 112, which is disposed toward the direction from which the envelope is reinserted, the flap will be pushed back into covering relation to opening 108 by reinsertion of the envelope. Thus, the developer will not tend to leak out from between the sheets since the flap has been replaced, and the negative is essentially a continuous sheet once again. This is also enhanced by the fact that the developer is spread from portion 112, at which the flap is attached to the sheet, toward the free end of the flap. Also, when the invention is used with conventional cut film, flap 110 will tend to be replaced by having portion 112 disposed toward the withdrawal portion of the holder.

From the foregoing explanation it may be seen that the apparatus of the present invention facilitates the making of back-reflection X-ray exposures in applications such as crystallography. Great economy in time of preparation of the photosensitive material for exposure is made possible by performing the cutting operation while the sheet is held in proper position for exposure. The fact that a replaceable flap is cut in the negative, rather than completely removing a portion thereof, is also helpful. The apparatus is equally suitable for employing film units of the self-developing type of conventional cut sheets of negative material. Furthermore, the apparatus is relatively uncomplicated and expedient in operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for preparing a sheet of photographic film for back-reflection X-ray exposure and for holding said sheet during said exposure, said apparatus comprising, in combination:
    (a) wall means defining a light-tight enclosure adapted to receive said sheet and having on one side thereof an exposure opening adapted to block visible light and permit the passage of X-rays;
    (b) cutter means movable with respect to said sheet, when the latter is positioned within said enclosure, to cut an opening therethrough;
    (c) means for selectively moving said cutter means to cut said opening;
    (d) means defining an X-ray path through said wall means and said opening and along which an X-ray beam may pass essentially unobstructed to said one side from the other side of said wall means and sheet; and
    (e) means for maintaining the light-tight condition of said enclosure during movement of said cutter means and passage of said X-ray beam.

2. The invention according to claim 1 wherein said cutter means includes a hollow, cylindrical member having a cutting edge which is advanced to pierce through said sheet, thereby forming said opening.

3. The invention according to claim 2 wherein engaging means are provided in the path of movement of said cutter means, on the side of said sheet opposite the side from which said cutter means is advanced, said engaging means being effective to releasably retain said cutter means in a position extending through said opening.

4. The invention according to claim 3 wherein said cutter means and said engaging means cooperate to form portions of said X-ray path means.

5. The invention according to claim 2 wherein said cutting edge is so constructed and moved relative to said sheet that the portion of said sheet which is moved to form said opening remains hingedly attached to the remainder of said sheet.

6. The invention according to claim 5 wherein said enclosure includes a passage for insertion and withdrawal of said sheet, and said portion of said sheet is moved toward said passage as said opening is formed, whereby said portion is positioned for movement back to covering relation to said opening as said sheet is moved out of said passage.

7. X-ray cassette apparatus for holding a photosensitive sheet during back-reflection X-ray exposure, said apparatus comprising, in combination:
    (a) a body portion defining a light-tight chamber having front and rear walls and a portion for insertion and withdrawal of said sheet into and out of said chamber;
    (b) means defining an exposure opening in said front wall;
    (c) light barrier means positioned in covering relation to said exposure opening and adapted to block visible light while permitting passage of X-rays therethrough;
    (d) a hollow cylindrical element movably associated with said front wall and movable through an opening in said light barrier to engage said sheet between said element and said rear wall;
    (e) cutter means associated with said rear wall and movable therethrough to pierce said sheet when the latter is engaged between said element and said rear wall; and
    (f) means defining a path for the passage of X-rays through said cutter means and said cylindrical element from the rear of said apparatus to strike a target positioned forwardly thereof.

8. The invention according to claim 7 wherein said light barrier is selectively movable to engage a major portion of the area of said sheet subject to exposure between said light barrier and an intensifying screen forming a portion of said rear wall.

9. X-ray cassette apparatus for holding during back-reflection X-ray exposure a photosensitive sheet of a film assembly of the self-developing type including a slidably removable opaque envelope initially enclosing said photosensitive sheet, an image-receiving sheet and a rupturable container of processing fluid, said apparatus comprising, in combination:
    (a) wall means defining a light-tight enclosure adapted to receive said sheet and having on one side thereof an exposure opening adapted to block visible light and permit the passage of X-rays;
    (b) inlet means through which said film assembly may be inserted into and withdrawn from said enclosure while maintaining the interior thereof in light-tight condition;
    (c) cutter means movable with respect to said photosensitive sheet, when the latter is positioned within said enclosure, to pierce through said sheet and form a flap hingedly attached to the remainder of said sheet, continued movement of said cutter means after piercing said sheet serving to move said flap to provide an opening in said sheet through which said cutter means extends;
    (d) the hinged attachment of said flap to said sheet being disposed toward said inlet means;
    (e) manually operable means for selectively advancing and retracting said cutter means with respect to said sheet; and
    (f) means defining a path along which an X-ray beam may pass essentially unobstructed through said cutter means, when the latter extends through said opening, from the rear of said apparatus to strike a target positioned forwardly thereof.

10. The invention according to claim 9 wherein said inlet means includes a pair of juxtaposed, pressure-applying members adapted to apply a compressive force to said film assembly, thereby rupturing said container and distributing the liquid contents thereof between said photosensitive and image-receiving sheets.

References Cited

UNITED STATES PATENTS 2,904,688   9/1959   Miller _____ 250—68

RALPH G. NILSON, *Primary Examiner.*

A. L. BIRCH, *Assistant Examiner.*